(12) United States Patent
Toft

(10) Patent No.: US 6,650,372 B2
(45) Date of Patent: Nov. 18, 2003

(54) DYNAMIC CHANGE OF FLICKER FILTER

(75) Inventor: Rolf Toft, San Fransisco, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 431 days.

(21) Appl. No.: 09/766,724

(22) Filed: Jan. 22, 2001

(65) Prior Publication Data

US 2002/0135701 A1 Sep. 26, 2002

(51) Int. Cl.[7] .................................................. H04N 5/21
(52) U.S. Cl. ..................... 348/615; 348/607; 348/910; 345/611
(58) Field of Search ................................. 348/607, 441, 348/447, 446, 910; 345/611; 382/265, 266–269

(56) References Cited

U.S. PATENT DOCUMENTS

| | | | | | |
|---|---|---|---|---|---|
| 4,454,506 A | * | 6/1984 | Netravali et al. | ........... | 340/728 |
| 4,999,706 A | * | 3/1991 | Kinghorn | ..................... | 358/147 |
| 5,019,904 A | * | 5/1991 | Campbell | .................... | 358/140 |
| 5,146,329 A | * | 9/1992 | Flamm | ........................ | 358/166 |
| 5,781,241 A | * | 7/1998 | Donovan | ..................... | 348/441 |
| 5,910,820 A | * | 6/1999 | Herz et al. | .................... | 348/446 |
| 6,094,226 A | * | 7/2000 | Ke et al. | ..................... | 348/446 |
| 6,130,723 A | * | 10/2000 | Medin | ....................... | 348/607 |
| 6,545,724 B1 | * | 4/2003 | Gryskiewicz | ............... | 348/597 |

\* cited by examiner

*Primary Examiner*—Victor R. Kostak
(74) *Attorney, Agent, or Firm*—Miller Patent Services; Jerry A. Miller

(57) ABSTRACT

A method and apparatus for providing a flicker filter for an interlaced video display. Content is analyzed to determine what type of filter or filter characteristics selected from a plurality of available filters or filter characteristics can provide the better display of the content. Based on this analysis, the filter characteristics are selected and used for flicker filtering the content for display.

28 Claims, 2 Drawing Sheets

DYNAMIC CHANGE OF FLICKER FILTER

FIELD OF THE INVENTION

This invention relates generally to the field of display of video images on interlaced raster scan displays. More particularly, this invention relates to a flicker filter for an interlaced raster scan video display.

BACKGROUND OF THE INVENTION

Interlaced display systems such as those used for television are generally well suited for display of images such as general television programming images. They are not so well suited for display of certain types of computer generated images such as web pages, text, windows and web page content. The interlaced raster system of such display systems produce a phenomenon known as "flicker". Flicker is caused by the interlacing of adjacent lines of the image, which for television type displays, occurs at a relatively low frequency. With certain types of displayed content, flicker becomes quite noticeable and disrupts the ability of the viewer to enjoy the viewing experience.

In order to reduce flicker, a filter known as a flicker filter has been used. Such filters reduce the flicker effect by removing components of the image which are most affected by flicker, or alternatively, by blurring the lines of an image to reduce sharpness. Most such techniques enhance the ability to view the image being displayed from a perspective of flicker reduction. This reduction in flicker is, of course, at some cost in sharpness or resolution, however, the resulting perception of flicker in the image can be dramatically reduced.

As television type displays become more widely used for display of computer information the role of the flicker filter becomes more critical. Various flicker filters have been developed with different algorithms and filter characteristics to deal with flicker. Unfortunately, no one set of filter characteristics is known to optimally deal with flicker in all image types. A filter which is optimized for text, for example, might not be well suited for certain types of graphic images.

SUMMARY OF THE INVENTION

The present invention relates generally to video displays. Objects, advantages and features of the invention will become apparent to those skilled in the art upon consideration of the following detailed description of the invention.

By way of summary and not limitation, certain embodiments of the present invention relate to a method and apparatus for providing a flicker filter for an interlaced video display. Content is analyzed to determine what type of filter or filter characteristics selected from a plurality of available filters or filter characteristics can provide the better display of the content. Based on this analysis, the filter characteristics are selected and used for flicker filtering the content for display. The analysis can, for example, be based upon a font type, font size, language type or graphics objects.

According to one embodiment, a flicker filter for a video display receives content for display on said video display. A flicker filter having a plurality of selectable filter characteristics is provided. A content analyzer analyzes the content to determine which of the plurality of filter characteristics to use for flicker filtering the content.

According to another embodiment consistent with the invention, a flicker filter for a video display receives content for display on said video display. A plurality of flicker filters each has respective filter characteristics. A switch is coupled to the filters for selecting one of the plurality of filters for filtering of images to be displayed on the video display. A content analyzer which analyzes the content to determine which of the plurality of filters to use for flicker filtering said content.

A method of providing a flicker filter function to a video display consistent with embodiments of the invention include receiving content to be displayed on the video display; analyzing the content to be displayed; and selecting a filter characteristic for flicker filtering based upon the analysis of the content.

Another method of providing a flicker filter function to a video display consistent with embodiments of the invention include receiving content to be displayed on the video display, the content comprising a graphics script file; analyzing the content to be displayed by determining a font type, a font size, and a language and by analyzing a graphic object; selecting a filter characteristic by selection of a filter algorithm and a plurality of filter coefficients from a lookup table for flicker filtering based on the analysis of the content; filtering said content using the selected filter characteristics; and displaying the content on an interlaced display.

A method and apparatus for providing a flicker filter for an interlaced video display is provided in accordance with embodiments of the invention. Content is analyzed to determine what type of filter or filter characteristics selected from a plurality of available filters or filter characteristics can provide the better display of the content. Based on this analysis, the filter characteristics are selected and used for flicker filtering the content for display.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawing in which:

DETAILED DESCRIPTION OF THE INVENTION

Figure 1:
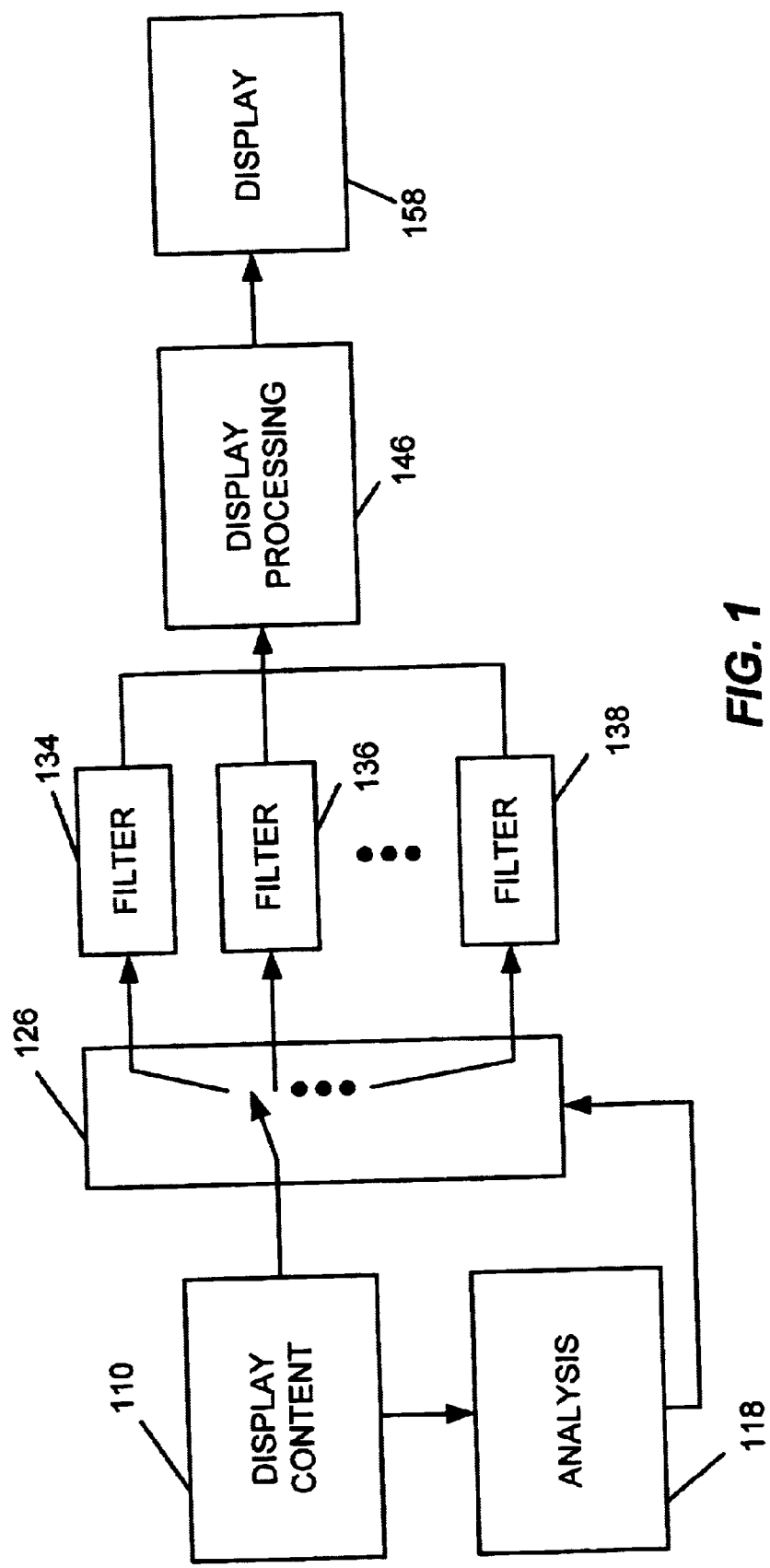
FIG. 1 is a conceptual block diagram of an embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Turning now to FIG. 1, there is shown a block diagram of a system 100 which describes operation of an embodiment of the present invention. In system 100, display content 110 includes, for example, a graphics script computer file which might contain text and graphics objects of various types. The content 110 is analyzed by a processor (e.g. a microcomputer and/or digital signal processor) in an analysis block 118. This analysis block 118 controls operation of a switch 126 which selects from a plurality of filters 134,136 through 138 for operation on the display content 110 prior to further processing at display processing 146 and display 158.

The result of the analysis 118 is selection of a filter from available filters 134, 136 through 138 for use in filtering the display content 110. In practice, the same actual digital filter might be used with a different set of filter parameter values (e.g. tap weights). Switching as shown in switch 126 is more practically accomplished in software by simply selecting a number of filter taps and a collection of weight values for the taps from a collection of such weight values stored in a storage device (e.g. disc drive or Read Only Memory (ROM)).

Figure 2:
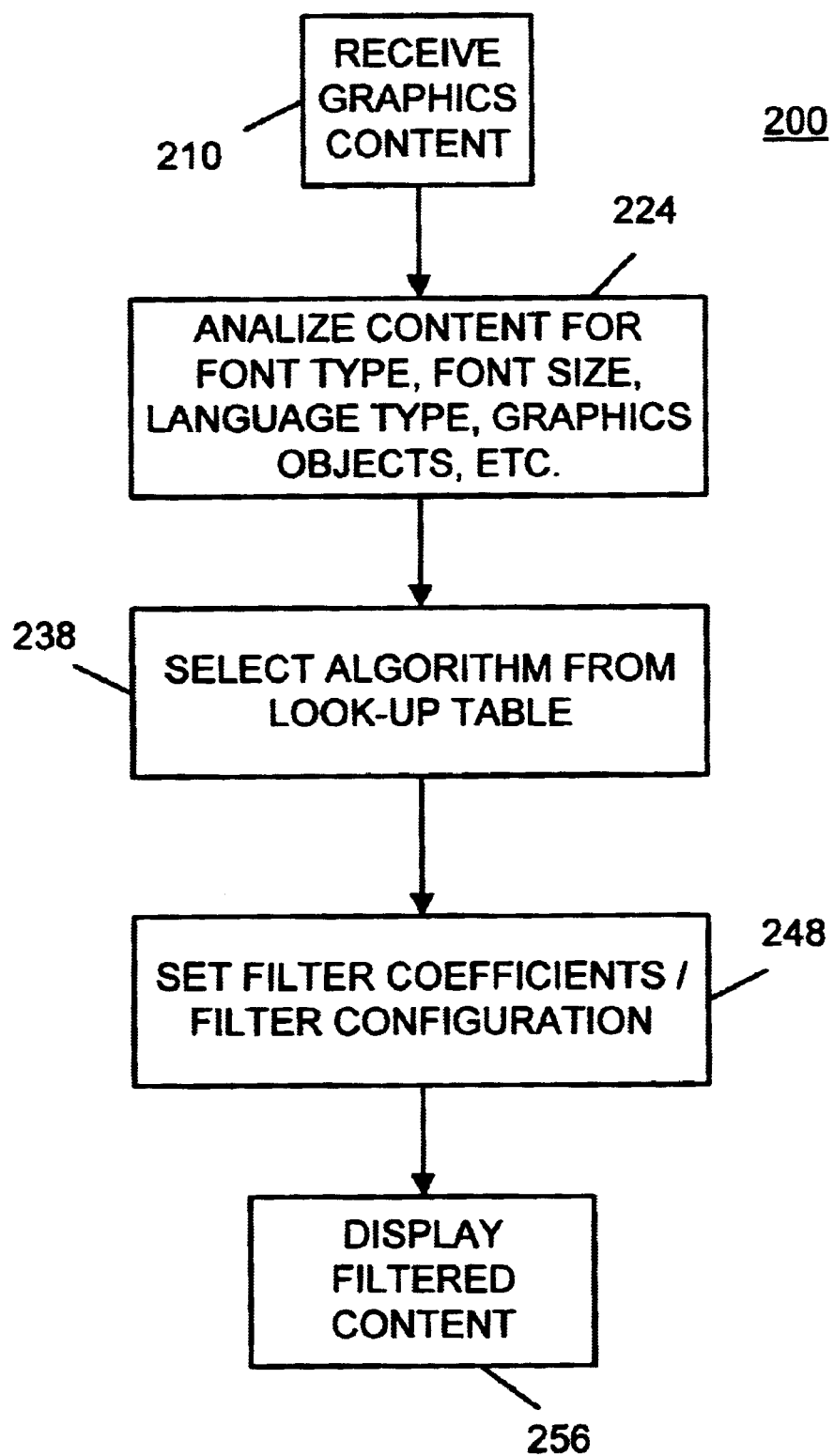
FIG. 2 is a flow chart of the broad overall process of the present invention.

The broad process of certain embodiments of the invention are outlined in the flow chart of FIG. 2 as process 200. In this process, a graphics script file is received at 210. This file might contain any number of objects and text or graphics attributes. The file is analyzed at 224 to ascertain certain key attributes of the content. For example, the analysis includes analysis of the content to determine: if it contains text and if so, what font type and font size is included; what language the text is written in; and whether the file contains graphics images. Such information can be used to categorize the file's content and correlate that categorization to a filter characteristic which is more suitable for that type of content. For example, flicker filters can be developed to optimize display of certain font types such as Courier, Ariel, Times Roman, etc. Other filters might be more suitable for Asian language characters such as Japanese kanji or Middle Eastern characters, etc. Some filters, or no filter at all, might produce optimum effects depending upon whether large or small font sizes are used, real images in the form of bitmapped, JPEG or gif or other file formats, graphics generated objects or live video images. Each type of image can be matched to an optimized filter for that type of image. However, even when only a small number of filters, e.g. three or four, are used and the images are categorized into broad categories, flicker can be dramatically improved over any particular compromise filter type.

Once the analysis is complete at 224, a filter algorithm (e.g. number of taps, tap weight values, FIR, IIR, etc.) is selected from a lookup table at 238 in accordance with the analysis and categorization at 224. The filter configuration and coefficients are set at 248 and the content is displayed as an image at 256.

Numerous types of filter configurations can be used to accomplish the present invention. Selection from a collection of only three filters plus no filtering has been found to provide very substantial improvements in the flicker perceived by observers, but of course, it is contemplated that even further improvement can be obtained by using additional filter characteristics for additional types of data being displayed. The filters used tap values as numbers as described in TABLE 1 below:

TABLE 1

| FILTER | FILE CONTENT | FILTER CHARACTERISTICS |
| --- | --- | --- |
| A | Full motion video | No Filtering |
| B | Large English Text | Two Tap; tap values 0:1:1 |
| C | Small English Text | Three Tap; tap values 1:2:1 |
| D | kanji characters | Three Tap; tap values 1:3:1 |

TABLE 1-continued

In general, smaller font sizes are displayed better with higher numbers of taps and more filtering. The same can be said of more intricate character sets with finer detail such as Kanji.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, microcontrollers, optical computers, analog computers, dedicated processors and/or dedicated hard wired logic may be used to construct alternative equivalent embodiments of the present invention.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, microcontrollers, optical computers, analog computers, dedicated processors and/or dedicated hard wired logic may be used to construct alternative equivalent embodiments of the present invention.

Those skilled in the art will appreciate that the program steps used to implement the embodiments described above can be implemented using disc storage as well as other forms of storage including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention is preferably implemented using a programmed processor executing programming instructions that are broadly described above in flow chart form and can be stored in any suitable electronic storage medium. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A flicker filter for an interlaced video display, comprising:
   means for receiving content for display on said interlaced video display;
   a flicker filter having a plurality of selectable filter characteristics;
   a content analyzer which analyzes the content to determine which of the plurality of filter characteristics to use for flicker filtering said content for display on said interlaced video display, wherein the analysis comprises making a determination as to whether the file contains graphics information or text information, and if the file contains text information the analysis further comprises an analysis of a language type or analysis of a font forming a part of the text information.

2. The apparatus of claim 1, wherein the content comprises a script file.

3. The apparatus of claim 1, wherein the content comprises a graphics script file.

4. The apparatus of claim 1, wherein the analysis of the font comprises analysis of the font size.

5. The apparatus of claim 1, wherein the analysis of the font comprises analysis of the font type.

6. The apparatus of claim 1, wherein the analysis comprises an analysis of graphic objects forming a part of the content.

7. The apparatus of claim 1, wherein the content analyzer selects a filter characteristic from a lookup table.

8. A flicker filter for an interlaced video display, comprising:
   means for receiving content for display on said interlaced video display;
   a plurality of flicker filters each having respective filter characteristics;
   a switch coupled to the filters for selecting one of the plurality of filters for filtering of images to be displayed on the interlaced video display; and
   a content analyzer which analyzes the content to determine which of the plurality of filters to use for flicker filtering said content for display on said interlaced video display. wherein the analysis comprises making a determination as to whether the file contains graphics information or text information, and if the file contains text information the analysis further comprises an analysis of a language type or analysis of a font forming a part of the text information.

9. The apparatus of claim 8, wherein the content comprises a script file.

10. The apparatus of claim 8, wherein the content comprises a graphics script file.

11. The apparatus of claim 8, wherein the analysis of the font comprises analysis of the font size.

12. The apparatus of claim 8, wherein the analysis of the font comprises analysis of the font type.

13. The apparatus of claim 8, wherein the analysis comprises an analysis of graphic objects forming a part of the content.

14. The apparatus of claim 8, wherein the flicker filter is selected from a lookup table.

15. A method of providing a flicker filter function to an interlaced video display, comprising:
   receiving content to be displayed on the interlaced video display;
   analyzing the content to be displayed; and
   selecting a filter characteristic for flicker filtering based upon the analysis of the content for display on said interlaced video display, wherein the analysis comprises making a determination as to whether the file contains graphics information or text information, and if the file contains text information the analysis further comprises an analysis of a language type or analysis of a font forming a part of the text information.

16. The method of claim 15, wherein the content comprises a script file.

17. The method of claim 15, wherein the content comprises a graphics script file.

18. The method of claim 15, wherein the analysis of the fonts comprises analysis of the font size.

19. The method of claim 15, wherein the analysis of the fonts comprises analysis of the font type.

20. The method of claim 15, wherein the analysis comprises an analysis of graphic objects forming a part of the content.

21. The method of claim 15, further comprising:
   filtering said content using the selected filter characteristics; and
   displaying the content on the interlaced display.

22. The method of claim 15, wherein the selecting comprises selecting from a lookup table.

23. A method of providing a flicker filter function to an interlaced video display, comprising:
   receiving content to be displayed on the interlaced video display, the content comprising a graphics script file;
   analyzing the content to be displayed by determining a font type, a font size, and a language and by analyzing a graphic object;
   selecting a filter characteristic by selection of a filter algorithm and a plurality of filter coefficients from a lookup table for flicker filtering based on the analysis of the content;
   filtering said content using the selected filter characteristics; and
   displaying the content on the interlaced display.

24. An electronic storage medium storing instructions which, when executed on a programmed processor, carry out a method of providing a flicker filter function to an interlaced video display, comprising:
   receiving content to be displayed on the interlaced video display;
   analyzing the content to be displayed by determining a font type, a font size, and a language and by analyzing a graphic object; and
   selecting a filter characteristic for flicker filtering based upon the analysis of the content.

25. The electronic storage medium of claim 24, wherein the content comprises a script file.

26. The electronic storage medium of claim 24, wherein the content comprises a graphics script file.

27. The electronic storage medium of claim 24, further comprising:
   filtering said content using the selected filter characteristics; and
   displaying the content on the interlaced display.

28. The electronic storage medium of claim 24, wherein the selecting comprises selecting from a lookup table.

* * * * *